(12) United States Patent
Degoulet et al.

(10) Patent No.: US 7,319,727 B2
(45) Date of Patent: Jan. 15, 2008

(54) METHOD FOR DIVERSITY RECEPTION OF A MULTICARRIER SIGNAL, RECEIVER AND CORRESPONDING SYSTEM

(75) Inventors: Gabriel Degoulet, Rennes (FR); Erwan Launay, Rennes (FR); Bertrand Sueur, Rennes (FR)

(73) Assignee: Telediffusion de France, Paris (FR)

( * ) Notice: Subject to any disclaimer, the term of this patent is extended or adjusted under 35 U.S.C. 154(b) by 416 days.

(21) Appl. No.: 10/483,907

(22) PCT Filed: Jul. 16, 2002

(86) PCT No.: PCT/FR02/02538

§ 371 (c)(1),
(2), (4) Date: Jul. 16, 2004

(87) PCT Pub. No.: WO03/009519

PCT Pub. Date: Jan. 30, 2003

(65) Prior Publication Data

US 2004/0240576 A1    Dec. 2, 2004

(30) Foreign Application Priority Data

Jul. 17, 2001    (FR) .................................... 01 09558

(51) Int. Cl.
*H04B 7/10* (2006.01)

(52) U.S. Cl. ................ 375/347; 375/267; 455/132
(58) Field of Classification Search ............... 375/346, 375/349, 267, 260, 227, 347; 455/132, 504
See application file for complete search history.

(56) References Cited

U.S. PATENT DOCUMENTS

| | | | | |
|---|---|---|---|---|
| 5,553,102 A | * | 9/1996 | Jasper et al. ................. | 375/347 |
| 5,920,549 A | * | 7/1999 | Bruckert et al. ............ | 370/331 |
| 6,070,086 A | * | 5/2000 | Dobrica ...................... | 455/522 |

(Continued)

FOREIGN PATENT DOCUMENTS

EP    1 045 531    10/2000

(Continued)

OTHER PUBLICATIONS

Alamouti, "A simple transmit diversity technique for wireless Communications", IEEE Journal on Selected Areas in Communications, vol. 16, Issue 8, Oct. 1998 pp. 1451-1458.*

*Primary Examiner*—Mohammed Ghayour
*Assistant Examiner*—Juan Alberto Torres
(74) *Attorney, Agent, or Firm*—Westman, Champlin & Kelly, P.A.

(57) ABSTRACT

A method is provided for receiving a multicarrier signal in a receiver implementing at least two distinct reception channels. After receiving the multicarrier signal during a first step, and in order to optimize subsequent processing (such as synchronization, confidence computing, . . . ), information representing the reception quality is associated to each corresponding reception channel during a second step. An embodiment of the disclosure relies on a new way of computing this information, called absolute confidence, which takes account on the one hand of the reception quality of the considered channel compared to the other channels (total confidence) and on the other hand of the reception quality of each source data (carrier) compared to the others, in the considered channel (relative confidence), to determine an absolute confidence for each data of each channel.

26 Claims, 3 Drawing Sheets

U.S. PATENT DOCUMENTS

| | | | |
|---|---|---|---|
| 6,115,426 A * | 9/2000 | Fujimoto et al. | 375/260 |
| 6,529,783 B1 * | 3/2003 | Combelles et al. | 700/39 |
| 7,039,137 B1 * | 5/2006 | Lauterjung et al. | 375/349 |
| 7,120,212 B1 * | 10/2006 | Launay et al. | 375/347 |
| 2003/0027540 A1 * | 2/2003 | Da Torre | 455/277.1 |

FOREIGN PATENT DOCUMENTS

| | | |
|---|---|---|
| FR | 2 768 278 | 3/1999 |
| FR | 2 786 048 | 5/2000 |

* cited by examiner

METHOD FOR DIVERSITY RECEPTION OF A MULTICARRIER SIGNAL, RECEIVER AND CORRESPONDING SYSTEM

This Application is a Section 371 National Stage Application of International Application No. PCT/FR02/02538 filed Jul. 16, 2002 and published as WO 03/009519 on Jan. 30, 2003, not in English.

BACKGROUND

The field of the invention is that of the reception of digital signals, in receivers implementing at least two distinct reception channels, namely at least two channels supplied with distinct data streams but conveying (at least partially) the same source symbols.

BACKGROUND OF THE INVENTION

Thus, the invention can be applied especially to receivers implementing antenna diversity, each antenna receiving the same signal sent but with disturbances that are different as the case may be, the transmission channels being distinct. More generally, the invention can be applied in all cases where two distinct data streams bearing the same source symbols are available (whether these streams are similar or transmitted on different frequency bands and/or different channels, encoded and/or modulated differently etc.).

A particular field of application of the invention is that of the RF broadcasting of multicarrier signals, especially in digital television (for example, according to the DVB-T standard), designed especially for mobile or portable receivers.

In this situation, it is already been proposed to use antenna diversity techniques. These techniques rely on the simultaneous reception of a same sent signal on several antennas. It is considered that since, as compared with a single-antenna receiver (without antenna diversity), not all the channels undergo the same disturbances related to the transmission channel, the signal obtained can be decoded more satisfactorily by recombining the signals present at each antenna.

This recombining is generally done by "weighting and summing", i.e. by the computation, at each point in time, of a linear combination of the signals coming from each antenna. This can be done through several approaches which are distinguished from one another by the mode of computation of the associated weighting operations.

The equal gain combining (EGC) technique sums the signals in phase, the selection combining (SC) technique selects the signal with the highest signal-to-noise ratio, the maximum ratio combining (MRC) technique weights the signals by the ratio of the amplitude of their attenuation to the power of the additive noise that the channel can subject them to, before summing them in phase.

Assuming signals subjected to independent attenuation (related to the channel) and independent additive noise (related to the first amplification stages), the maximum ratio combining (MRC) technique maximizes the mean signal-to-noise ratio obtained after recombination and gives results superior to those obtained by the EGC and SC techniques. It is the use of this technique that is generally preferred.

The literature on the subject contains many examples of transmission systems using antenna diversity. One particular technique is thus described in the patent document FR-98 14438, filed on behalf of the proprietors of the present patent. According to this technique, the reception device comprises means for the combination of said estimated channel values into an adapted estimated value, said combination taking account of said the channel confidence information to weight said estimated channel values.

On an average, antenna diversity provides a gain in the signal-to-noise ratio, generally in the range of 5 to 10 dB, especially in difficult conditions of reception (reception in urban areas, with mobile or portable equipment etc.).

However, in certain situations, the implementation of the recombination may lead to poor-quality results. Indeed, the symbols delivered by the channel are assigned a confidence value, hereinafter called a relative confidence value, computed independently on each channel to perform the demodulation.

These relative confidence values may therefore be standardized differently on each reception channel. This difference in standardization introduces a bias in computation during the combination of the data coming from the different reception channels, when one of these channels shows average conditions of deterioration in reception (poor signal-to-noise ratio) as compared with other channels. This phenomenon is not rare in practice, and masks the high performance of a diversity of antennas.

Furthermore, the classic techniques necessitate an independent synchronization of each reception channel. The reception channels are then synchronized by means of FIFO memories. If the signal is too poor on a single channel at a given point in time, the entire receiver may get de-synchronized. Here again, it seems that the phenomenon is not rare in practice and that, in such conditions, the gain provided by diversity is masked by the poor performance of the synchronization.

SUMMARY

It is a goal of the invention especially to overcome these drawbacks of the prior art.

More specifically, it is a goal of the invention to provide a technique for the reception of an original signal implementing at least two reception channels that are efficient, or even optimal, even when one or more channels have an average signal-to-noise ratio that is poor.

It is another goal of the invention to provide a reception technique of this kind that is simple to implement, and requires no complex processing whether it is in the processing systems associated with each of the channels or after recombination.

It is yet another goal of the invention to provide a technique of this kind that is adapted to easy industrial-scale implementation especially in the context of systems that also implement single-channel receivers.

It is also a goal of the invention to provide a reception technique of this kind that enables an improvement in synchronization, frequency and temporal feedback control systems, automatic gain control etc.

BRIEF SUMMARY OF THE INVENTION

These goals, as well as others that will appear here below, are achieved by means of a method for the reception of a multicarrier signal formed by a plurality of carrier frequencies, implementing at least two reception channels supplied with data streams, each of said channels conveying the same source data, each of said channels associating an estimated channel value and a corresponding piece of information on channel confidence with each piece of source data received, to feed combination means followed by decoding means. According to the invention, the method implements a processing operation taking account of at least one piece of information representing the reception quality on each of said channels, to optimize at least one step of said reception.

Thus, the reception quality on each of the channels is taken into account, so as to give preference to the channel or channels having better reception quality and, conversely, so as to reduce the harmful effect of one or more channels having poor reception quality.

This approach optimizes processing and delivers optimized confidence information and/or generates feedback control systems that are more efficient.

Thus, according to a first advantageous aspect of the invention, said pieces of information representing the quality of reception on each of said channels are taken into account to determine said piece of information on channel confidence which is then called absolute confidence.

In this case, with a source data being conveyed by a subset of said set of carrier frequencies, comprising at least one carrier frequency, said absolute confidence preferably takes account of the following:

a first piece of information on confidence, known as relative confidence, determined as a function of carrier frequencies of said channel; and a second piece of information on confidence, known as total confidence, determined as a function of carrier frequencies of at least one other reception channel.

Thus, according to the invention, if the reception quality on one of the channels deteriorates, the data used for the subsequent processing (Viterbi decoding for example) will take this channel less into account, and will give preference to the data delivered by the other channels. The final result will be of higher quality.

Advantageously, each of said subsets corresponds to a carrier frequency of said multicarrier signal.

Preferably, to obtain the highest efficiency, said total confidence is computed on a duration of the order of at least one symbol.

The method of the invention can be applied to special advantage in receivers implementing antenna diversity, each of said channels being associated with an antenna capable of receiving a multicarrier signal sent.

According to a preferred mode of implementation of the invention, said piece of information representing quality takes account of an estimation of the signal-to-noise ratio in the corresponding reception channel.

Said piece of information representing quality may take account especially of at least one of the following pieces of information:

error between the pieces of data received an each carrier and their projection at the closest point of a corresponding constellation of modulation;

information on automatic gain control (AGC);

analysis of a learning sequence and/or of pilot frequencies.

In one particular embodiment, said piece of information representing quality also takes account of the variance of the noise for each symbol and on each of the channels.

More generally, the information representing quality on the channel may be an estimation of the signal-to-noise ratio (SNR) of any type and, for example, it may be represented by the inverse of the variance of the noise ($1/\Sigma^2$).

Said piece of information on absolute confidence may advantageously be computed as follows:

$$\mathrm{Cfd\_MRC}(k, S) = \sum_i Cfd'_i(k, S) \Big/ \sum_i 1 \Big/ \sum_i^2 (S)$$

where:

Cfd'i is said relative confidence associated with the data conveyed by the carrier k of the symbol S in the channel i;

$1/\Sigma^2$ is a piece of information representing the signal-to-noise ratio for the symbol S in the channel i.

Advantageously, said piece of information $\Sigma^2$ is an estimation of the variance of the noise for the symbol S in the channel i.

According to a second preferred aspect of the invention, said pieces of information representing quality are used to optimize at least one reception feedback control system.

It is thus possible to synthesize a single, optimized feedback control command, delivered to all the channels.

Preferably, said feedback control system or systems implement a weighting by means of said pieces of information representing quality.

According to one mode of implementation, said pieces of information representing quality are used to select at least one channel, known as a reference channel or channels, having better quality of total reception, according to a predetermined criterion, at a given point in time. It is then the feedback control systems produced by this channel or these channels (or defined on the basis of this channel or these channels) that are delivered to all the channels.

According to another advantageous embodiment, said piece of information representing quality is used, in a module designed for this purpose, to prepare at least one synthesized feedback control command, distributed to at least two of said channels.

This may be considered to be the definition of a reference channel (at least for automatic control part) presenting at least one total characteristic corresponding to a mathematical combination of characteristics of at least two of said channels and/or delivering at least one total command corresponding to a mathematical combination of commands corresponding to at least two of said channels.

Advantageously, the selection of said reference channel implements a hysteresis mechanism, in order to avoid constant changes.

Preferably, one of said optimized feedback control systems acts on a single system clock feeding each of said channels.

Similarly, an optimized feedback control system may advantageously be implemented for the temporal feedback control of at least one of the functions belonging to the group comprising the following functions:

clock frequency;

sampling frequency;

localization of the symbols;

position of a guard interval;

localization of frames;

localization of super frames;

localization of a particular data structure;

detection of a synchronization pulse.

An optimized feedback control system can also be implemented, advantageously for the control of the demodulated carrier frequency (AFC: automatic frequency control), and/or for the automatic gain control (AGC) in reception.

The invention also relates to the receivers of a multicarrier signal implementing the method as described here above.

A receiver of this kind implements a processing operation taking account of at least one piece of information representing the quality of reception on each of said channels, to optimize at least one operation of said reception.

Advantageously, according to a first aspect of the invention, said information representing quality is taken into account by means for determining a piece of information on confidence assigned to each of said estimated channel values.

Preferably, according to a second aspect of the invention, the receiver implements at least one optimized feedback control system, taking account of said information representing quality.

A receiver of this kind preferably delivers at least one unique optimized feedback control command to at least one of said channels.

According to a particular embodiment of the invention, each of said channels is set up by means of processors that can also be implemented in a single-channel receiver.

The invention also relates to systems for the transmission or broadcasting of at least one multicarrier signal formed by a plurality of carrier frequencies, to at least one receiver implementing at least two reception channels. According to the invention, at least one of said receivers implements a processing operation that takes account of at least one piece of information representing the quality of reception on each of said channels, to optimize at least one step of said reception.

According to an advantageous embodiment, a system of this kind comprises single-channel receivers and receivers with at least two reception channels, the single and multi-channel receivers being configured to be implemented using the same type of processor designed to be used alone in a single-channel receiver and in each of the channels of a receiver with at least two reception channels.

BRIEF DESCRIPTION OF THE DRAWINGS

Other features and advantages of the invention shall appear more clearly from the following description of a preferred embodiment, given by way of a simple, non-restrictive example, and from the appended drawings of which.

DETAILED DESCRIPTION OF ILLUSTRATED EMBODIMENTS

Figure 1:
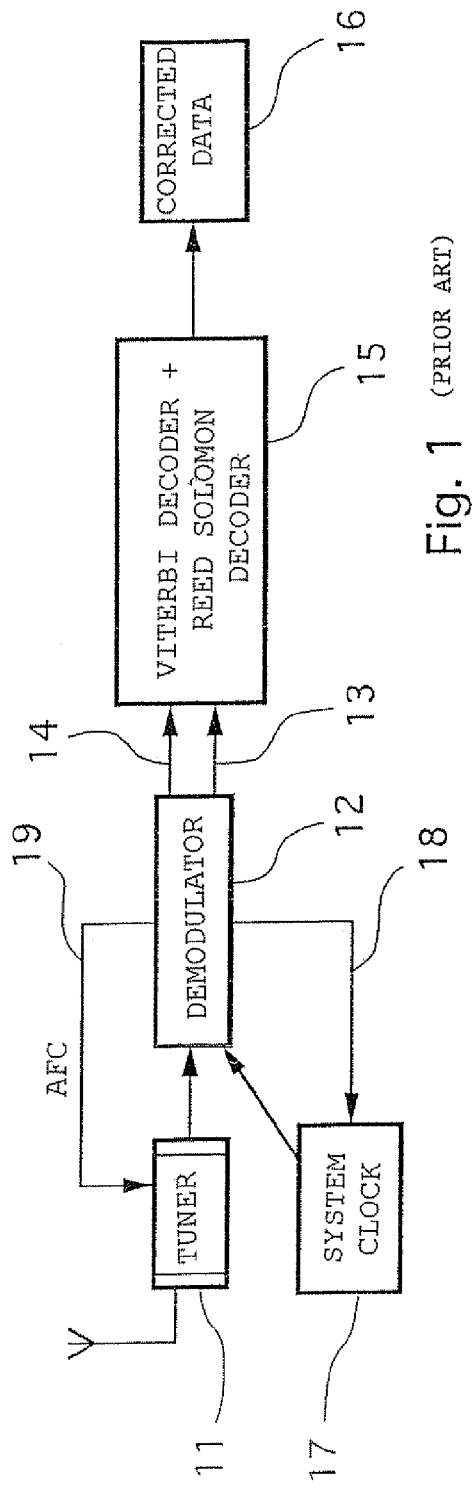
FIG. 1 illustrates the classic architecture of a single-antenna multicarrier receiver.
Figure 4:
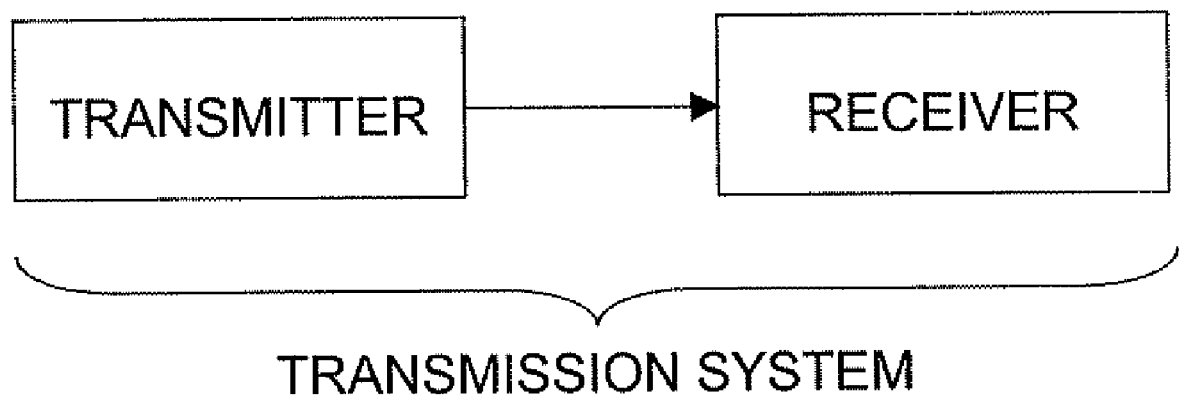
FIG. 4 illustrates one embodiment of a transmission system comprising a transmitter configured to transmit a multicarrier signal to a receiver.

Before presenting the invention in detail, we shall first recall the architecture of a Coded Orthogonal Frequency Division Multiplexing (COFDM) single-channel multicarrier receiver as illustrated in FIG. 1 that can be used in a transmission system comprising a transmitter and receiver as illustrated in FIG. 4.

The tuner 11 receives the antenna signal, selects the channel and sends the signal contained in the selected band to the demodulator 12. The functions performed by the demodulator 12 essentially comprise an FFT (fast Fourier transform), a channel estimation and a carrier-by-carrier equalization.

For each carrier k of the symbol S the channel estimation assesses the transfer function of the channel h(k,S) and the mean noise $\sigma^2(S)$. Classically, the equalization consists of the complex multiplication of the data y by the inverse of the estimation of the channel h. Then, for each carrier of the symbol, the demodulator gives the data $x(k,S)=y(k,S)/h(k,S)$ 13 and the associated piece of information on confidence $Cfd(k,S)=h(k,S)^2/\sigma^2(S)$ 14 to the Viterbi decoder 15 or channel decoder.

This decoder delivers corrected data 16, to implement the source decoding.

A clock system 17 drives the demodulator 12. It is controlled by a piece of feedback control information 18 delivered by the demodulator 12. This demodulated delivers a piece of automatic frequency control (AFC) information 19 to the tuner 11.

A first approach to antenna diversity would be to quite simply and purely duplicate the architecture of FIG. 1. As was discussed further above, this is not an optimal solution. However, it is desirable to maximize the resemblance between a single-channel receiver and a channel of a multiple-channel receiver, for obvious reasons of cost price and production.

Figure 2:
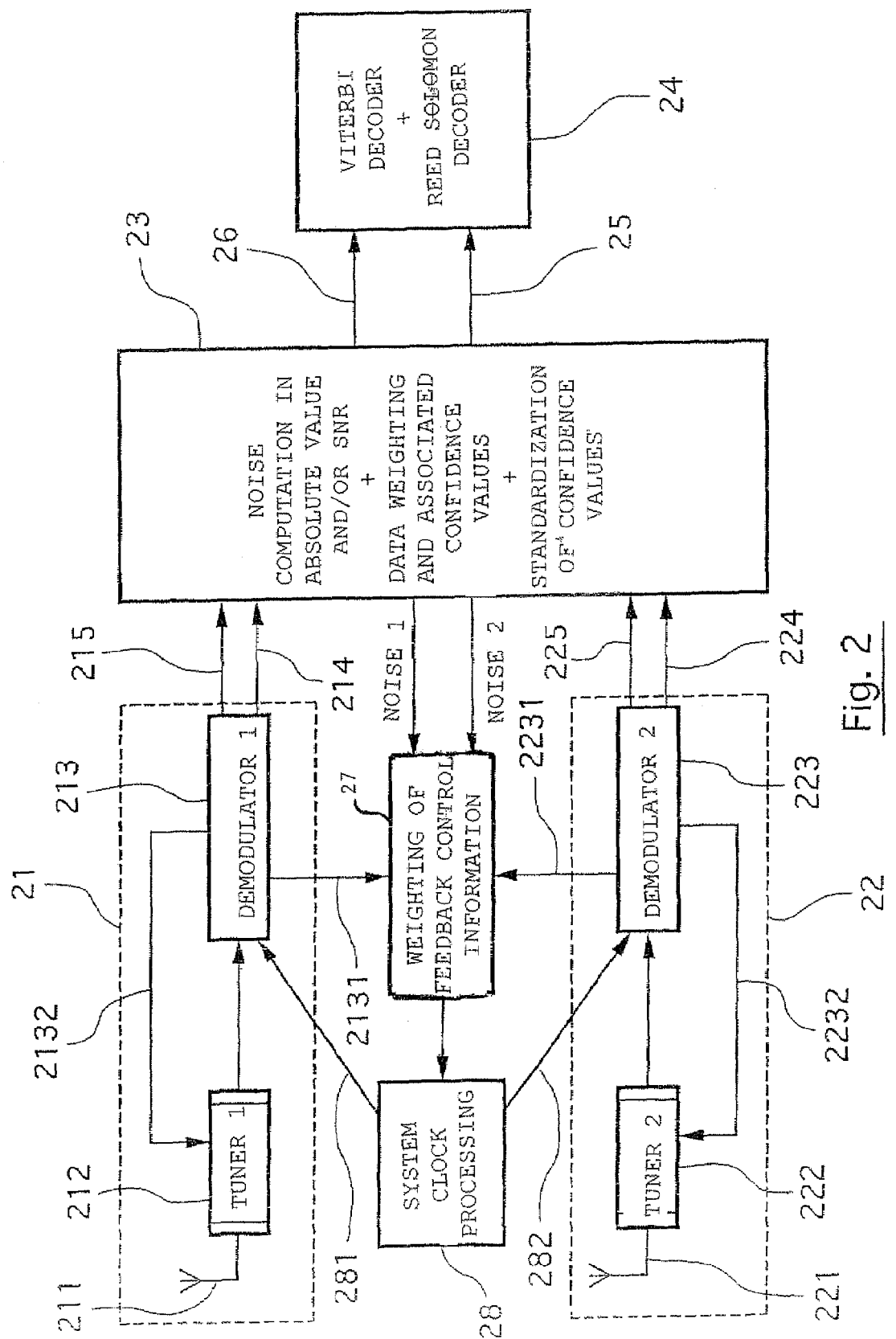
FIG. 2 is a block diagram of a receiver with (two-channel) antenna diversity according to the invention.

A receiver that can be used in the transmission system of FIG. 4 and according to the invention is illustrated in FIG. 2. The invention takes account of the signal-to-noise ratio on each of the reception channels, especially in order to:

"give extra weight" to the confidence values assigned to the data received on each carrier of each of the channels (confidence value assigned to each carrier of a symbol relative to all the carriers of said symbol) so that if the reception quality deteriorates in one of the channels, the data used for the following Viterbi decoding step takes account chiefly of the least noise-affected data.

synthesize or generate an optimized synchronization of the receiver, taking account of all the channels, weighted as a function of the noise. The command may be selective or it may form part of a weighting operation. Should the command be selective, this approach can be likened to the definition, in terms of feedback control, of a master channel and slave channels, where the nature of each channel (master or slave channel) can evolve in time. In the case of a weighting operation, this approach can be likened to the definition of a reference channel, which is in principle more efficient.

command any feedback control needed for reception in diversity, such as:
  automatic frequency control systems: control of the frequency of the demodulated carriers (automatic frequency control);
  feedback control of reception gains (for each channel): automatic gain control;
  automatic temporal control: clock frequency, sampling, localization of symbols, position of the guard interval, localization of frames, superframes and other data structures, various synchronization pulses for the processing of received data, as a function of this same strategy.

FIG. 2 is a block diagram of an improved antenna diversity receiver, according to the invention. Only two channels 21 and 22 are shown, respectively associated with the antennas 211 and 221. Naturally, the principle can be extended to more than two channels. This example is deliberately simplified to make it easier to understand the invention.

Each channel 21 and 22 has a tuner 212 and 222, respectively supplied by an antenna 211 and 221, and then a demodulator 213 and 223, which delivers demodulated data 214 and 224, accompanied by a piece of information on confidence 215 and 225.

A processing module 23 receives these different elements to give a Viterbi decoder 24, associated with a Reed-Solomon decoder (or decoding means designed to carry out similar operations), "total" data 25, each assigned a "total" confidence value 26. The term "total" is understood here to mean "taking account of at least two channels" as compared with "single-channel" data and confidence.

This processing module 23 performs especially the following operations:
computation of noise in terms of absolute value;
weighting of data and of the associated confidence values;
standardization of confidence values.

These aspects are presented in greater detail here below.

Depending on the information on noise 26, and the feedback control information 2131 and 2231 delivered by the demodulators 213 and 223, a module 27 for weighting the feedback control information controls a single processing module 28 for the processing of the system clock, which controls (281, 282) all the demodulators 213 and 223.

In the example shown, the pieces of AFC information 2132 and 2232 are determined by each of the demodulators. According to another approach, they may be determined in a centralized way by the module 23. Similarly, this module may determine any piece of information that is worth distributing homogeneously (example synchronization) between the different channels and/or can be improved by taking account of information presented on each channel.

The antenna diversity receiver advantageously uses the basic bricks of the architecture of a single-antenna receiver (FIG. 1) with the modifications described here below:

namely:
Cfd1(k,S) and Cfd2(k,S) are confidence values respectively associated with the data conveyed by the carriers k of the symbol S on the reception channels 21 and 22.
x1(k,S) and x2(k,S) are the payload data conveyed by the carriers k of the symbol S on the reception channels 1 and 2.

For each carrier, the processor 23 computes a single combined value x_MRC(k,S) of the data and a single confidence value Cfd_MRC(k,S). These values are then decoded by the Viterbi decoder.

The optimum values of x_MRC(k,S) and Cfd_MRC(k,S) are:

$$Cfd\_MRC(k,S) = Cfd1(k,S) + Cfd2(k,S)$$
$$x\_MRC(k,S)=[Cfd1(k,S) \times x1(k,S) + Cfd2(k,S) \times x2(k,S)] / Cfd\_MRC(k,S)$$

The decoding of the data is then done normally at output of the Viterbi decoding 24 (block decoding, MPEG2 decoding).

A method must be implemented to synchronize (28) the reception on both channels and thus enable the combination of data associated with one and the same carrier of the same symbol. According to the prior art, the method generally uses FIFOs, synchronized with the pulses generated by the DVB-T decoding circuits used on each channel, each time they detect a new symbol (for fear of a lengthy propagation time between the two reception antennas).

According to the invention, the noise is computed in terms of absolute value for the weighting of the MRC processing and standardization of the associated confidence values:

Let $\Sigma^2 1(S)$ and $\Sigma^2 2(S)$ be the result of the computation of the noise variance achieved for the symbols S on the channels 1 and 2 (respectively). This computation is preferably done solely on the basis of the data received on each channel and, as the case may be, on the basis of the AGC information available (to enable a structure of the receiver that is modular and compliant with the current digital RF broadcasting standards).

According to the invention, the above computation becomes:

$$Cfd'1(k,S) = Cfd1(k,S)/\Sigma^2 1(S) \ \& \ Cfd'2(k,S) = Cfd2(k,S)/\Sigma^2 1(S)$$
$$Cfd\_MRC(k,S) = [Cfd'1(k,S) + Cfd'2(k,S)] / [1/\Sigma^2 1(S) + 1/\Sigma^2 2(S)]$$
$$x\_MRC(k,S)=[Cfd'1(k,S) \times x1(k,S) + Cfd'2(k,S) \times x2(k,S)] / Cfd\_MRC(k,S)$$

This approach enables flexible and adaptive management of a master-slave synchronization, where the master channel can be obtained by the selection of one of the channels, with hysteresis mechanism to prevent an excessively great number of changes or it enables synthesized management, namely management on the basis of a weighting of at least certain channels.

More specifically, the master-slave function may be implemented according to a classic approach, a selection of one of the channels, or an implementation of the generation of composite feedback control commands. For example, if a command is sent to a voltage-controlled oscillator (VCXO) to carry out a fine temporal synchronization, it is possible to envisage sending the VCXO (which is then unique for both channels) a command equal to the linear combination of the commands generated on each channel weighted by the extra-weight value.

The development can thus relate to the selection of the channel or channels to be taken into account and/or the combination (proportions) of the channels taken into account to define the master channel, whether it is real or virtual.

The two channels are automatically controlled by the same clock (VCXO). The computation of an estimation of the signal-to-noise ratio in terms of absolute value of each demodulator (for example the computation of the variances of the noise: $\Sigma^2 1(S)$ and $\Sigma^2 2(S)$ is used to weight the feedback control information (relating to temporal and, as the case may be, frequency synchronization) computed on each reception channel. The information on feedback control consists of digital values computed in the feedback control loop of each demodulator.

The feedback control information of each demodulator is advantageously taken into account in the form of a computation of the weighted average (weighted individually by the noise related to each demodulator) of the feedback control commands computed on each channel.

The values $\Sigma^2 1(S)$ and $\Sigma^2 2(S)$ may be computed especially by the computation of the mean square deviation between the payload data x1(k,S) and x2(k,S) and their projection on the expected constellations of modulation (indeed, the processor that performs the MRC operation always has access to this data whereas the availability of the AGC commands is not guaranteed).

Figure 3:
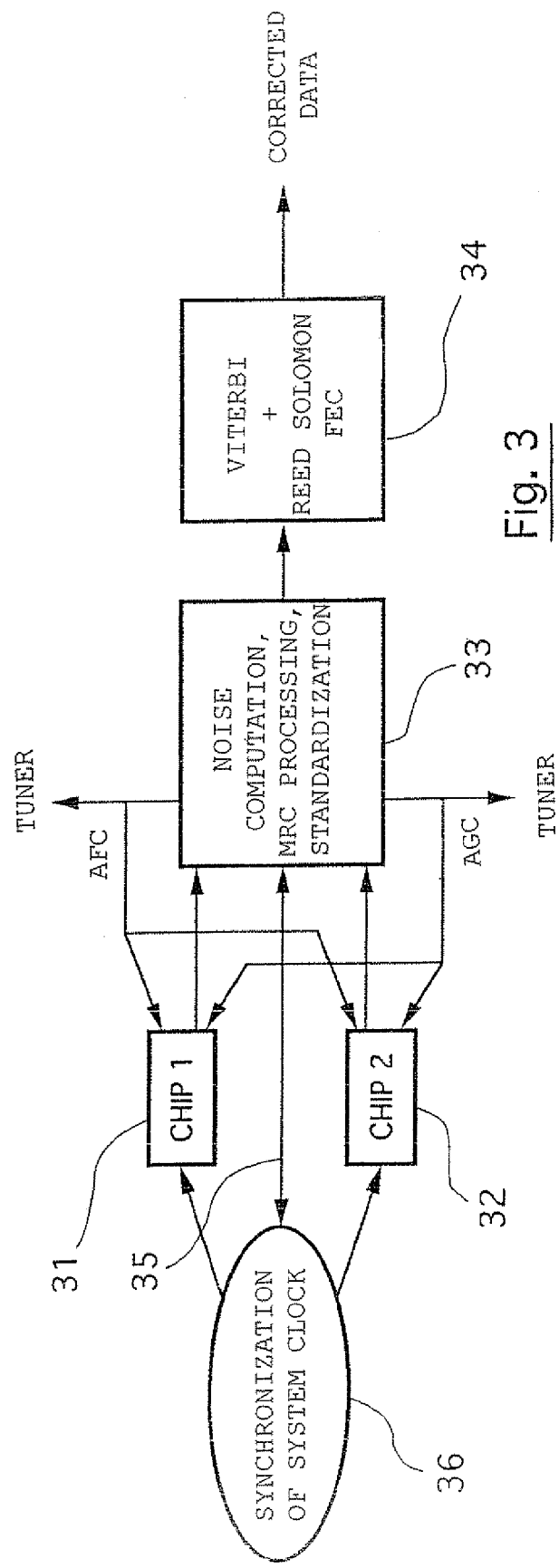
FIG. 3 illustrates a modular embodiment of a receiver according to the invention.

An improved diversity receiver of this kind can be made in a "modular" way by using integrated circuits designed for single-antenna reception but having inputs/outputs necessary for an external processor, as illustrated in FIG. 3.

Each channel therefore has a reception and demodulation processor 31, 32 which powers a single module 33, made for example in the form of a programmable component which carries out the noise computation, the MRC processing and the standardization. It feeds a Viterbi and a Reed-Solomon FEC (Forward Error Correction) decoding module 34. This component 33 is therefore a component specific to multiple-channel operation. Of course, it also performs all the operations described further above (the management of the reference channel, the determining of a synthesized channel, a single clock, feedback controls, etc).

The components 31 and 32 for their part are the same as those used in a single-channel receiver. They furthermore comprise the input/outputs necessary for the implementation of a diversity of antennas, and especially an output 35 for driving the synchronization clock system 36.

The Viterbi decoding function can be achieved internally in one of the two processors 31, 32 if the required inputs are available.

The invention thus proposes an efficient implementation or even an optimum implementation, within a receiver (especially a COFDM receiver), of a method of reception with antenna diversity, implementing especially the following aspects:

An estimation of the signal-to-noise ratio is achieved by a process of performing the operation of combining the signals received on the different channels. This can be done, for example, solely on the basis of the information on confidence and the data received in each channel, in computing the mean square deviation between the data received and their projection on the closest point of the initially transmitted constellation, or more simply on the basis of the AGC information given to each tuner, or on the basis of both these pieces of information. The use of learning or pilot sequences can also be planned.

A set of feedback control commands is implemented. This can be done easily on the basis of information on signal-to-noise ratio estimated by the processor achieving the operation of combining the signals received and referred to here above: it is possible to for example, by means of this information on signal-to-noise ratio, to weight the feedback control commands computed on each reception channel before sending them to the devices to be subjected to feedback control.

To this end, the following are implemented in particular:

a computation of an absolute value of the signal-to-noise ratio on each channel, fulfilling the "extra confidence" role assigned to each reception channel;

the use of this "extra confidence" role, updated periodically, to combine the data received on different channels, in order to optimize the reception of the data and the synchronization of the receiver;

The invention thus removes the need for the FIFO memories usually employed to reset the data in phase before they are combined (after the stage of demodulation of each channel) or at least substantially reduces the size of these memories, and gives optimized efficiency.

The invention claimed is:

1. A method for the reception of a multicarrier signal formed by a plurality of carrier frequencies, the method comprising:
   receiving the multicarrier signal carrying source data, implementing at least two reception channels each supplied with said multicarrier signal,
   determining information on absolute channel confidence for each of said channels, and
   associating, in each of said channels and with each piece of source data received, an estimated value of said piece of source data and corresponding information on absolute channel confidence, to feed a module configured to combine source data to provide total data for a decoder configured to decode said total data, wherein said information on absolute confidence takes account firstly of information on total confidence, representing a quality of reception on said channel relative to at least one other channel, and secondly of information on relative confidence, representing the quality of reception of the concerned source data in said channel, relative to at least one other piece of source data received on the same channel.

2. The method according to claim 1 wherein a piece of source data is conveyed by a subset of said plurality of carrier frequencies comprising at least one carrier frequency, and wherein determining information on absolute confidence comprises:
   determining said relative confidence as a function of carrier frequencies of said channel; and
   determining said total confidence as a function of carrier frequencies of at least one other reception channel.

3. The method of reception according to claim 1, wherein said total confidence is computed on a duration of the order of at least one symbol.

4. The method of reception according to claim 1, further comprising implementing antenna diversity, wherein each of said channels is associated with an antenna capable of receiving a multicarrier signal sent.

5. The method of reception according to claim 2, wherein each of said subsets corresponds to a carrier frequency of said multicarrier signal.

6. The method of reception according to claim 1, where said absolute confidence takes account of an estimation of the signal-to-noise ratio in the corresponding reception channel.

7. The method of reception according to claim 1, wherein said absolute confidence takes account of at least the following information:
   error between the pieces of data received an each carrier and their projection at the closest point of a corresponding constellation of modulation;
   information on automatic gain control (AGC);
   analysis of a learning sequence and/or of pilot frequencies.

8. The method of reception according to claim 7, wherein the absolute confidence takes account of the variance of the noise for each symbol and on each of the channels.

9. The method of reception according to claim 1, wherein the absolute confidence is computed as:

$$Cfs\_MRS(k, S) = \sum_i Cfd'_i(k, S) \bigg/ \sum_i 1 \bigg/ \sum_i^2 (S)$$

where: Cfd'i is said relative confidence associated with the data conveyed by the carrier k of the symbol S in the channel i; $1/\Sigma^2_i(S)$ information representing the signal-to-noise ratio for the symbol S in the channel i.

10. The method of reception according to claim 9, wherein said piece of information $\Sigma^2\Sigma^2_i(S)$ is an estimation of the variance of the noise for the symbol S in the channel i.

11. The method of reception according to claim 1, and further comprising optimizing at least one reception feedback control system using said absolute confidence information.

12. The method of reception according to claim 11, wherein said feedback control system or systems implement a weighting by said absolute confidence information.

13. The method of reception according to claim 1, and further comprising selecting at least one reference channel having better quality of total reception, according to a predetermined criterion and at a given point in time, using said information of absolute confidence.

14. The method of reception according to claim 1, wherein said information of absolute confidence is used to prepare at least one synthesized feedback control command, distributed to at least two of said channels.

15. The method of reception according to claim 14, wherein a reference channel is defined having at least one total characteristic corresponding to a mathematical combination of characteristics of at least two of said channels and/or delivering at least one total command corresponding to a mathematical combination of commands corresponding to at least two of said channels.

16. The method of reception according to claim 11, one of said optimized feedback control systems acts on a single system clock feeding each of said channels.

17. The method of reception according to claim 11, wherein an optimized feedback control system is implemented for the temporal feedback control of at least one of the functions belonging to the group comprising the following functions:
    clock frequency;
    sampling frequency;
    localization of the symbols;
    position of a guard interval;
    localization of frames;
    localization of super frames;
    localization of a particular data structure;
    detection of a synchronization pulse.

18. The method of reception according to claim 11, wherein an optimized feedback control system is implemented for the automatic frequency control (AFC) of the demodulated carrier frequency.

19. The method of reception according to claim 11, wherein an optimized feedback control system is implemented for automatic gain control (AGC) in reception.

20. The method of reception according to claim 13, wherein the selection of said reference channel implements a hysteresis mechanism.

21. A receiver of a multicarrier signal, formed by a plurality of carrier frequencies, wherein the receiver comprises:
    at least two reception channels each supplied with said multicarrier signal and delivering an estimation of source data carried by said multicarrier,
    each of said channels comprising processing means associating, with each piece of source data received, an estimated value of said piece of source data and corresponding information on absolute channel confidence, to feed a module configured to combine source data to provide total data for a decoder configured to decode said total data, and
    wherein said information on absolute confidence takes account firstly of a piece of information on total confidence, representing a quality of reception on said channel relative to at least one other channel, and secondly of information on relative confidence, representing a quality of reception of the concerned source data in said channel, relative to at least one other piece of source data received on the same channel.

22. The receiver of a multicarrier signal according to the claim 21, wherein the receiver includes at least one optimized feedback control system, taking account of said values of absolute confidence.

23. The receiver of a multicarrier signal according to claim 22, wherein said at least one optimized feedback control system is configured to deliver at least one unique optimized feedback control command to at least one of said channels.

24. The receiver of a multicarrier signal according to claim 21, wherein each of said channels is set up by processors that can also be implemented in a single-channel receiver.

25. A system for the transmission of at least one multicarrier signal, formed by a plurality of carrier frequencies, toward a plurality of receivers, wherein said system comprises:
    a transmitter configured to transmit said at least one multicarrier signal; and
    a receiver comprising at least two reception channels, each channel being supplied with said multicarrier signal and delivering an estimation of source data carried by said multicarrier signal, wherein each channel is configured to associate, with each piece of source data received, an estimated value of said piece of source data and corresponding information on absolute channel confidence to feed module configured to combine source data to provide total data for a decoder configured to decode said total data, and wherein, in said receiver comprising at least two reception channels, said information on absolute confidence takes account firstly of information on total confidence representing the quality of reception on said channel relative to at least one other channel, and secondly of information on relative confidences representing the quality of reception of the concerned source data in said channels relative to at least one other piece of source data received on the same channel.

26. The transmission system according to claim 25 comprising at least one single-channel receiver, where the at least one single-channel receiver and the receiver with at least two reception channels are configured to be implementing using the same type of processor designed to be used alone in the single-channel receiver and in each of the channels of the receiver with at least two reception channels.

* * * * *

UNITED STATES PATENT AND TRADEMARK OFFICE
CERTIFICATE OF CORRECTION

PATENT NO. : 7,319,727 B2
APPLICATION NO. : 10/483907
DATED : January 15, 2008
INVENTOR(S) : Degoulet et al.

It is certified that error appears in the above-identified patent and that said Letters Patent is hereby corrected as shown below:

Column 10, line 36, please delete "claim 1, further" and insert --claim 1, and further--

Column 10, line 50, please delete "received an each carrier" and insert --received on each carrier--

Column 10, line 64, please delete " $Cfs\_MRS(k,S) = \sum_i Cfd'_i(k,S) / \sum_i 1 / \sum_i^2 (S)$ " and insert -- $Cfs\_MRS(k,S) = \sum_i Cfd'_i(k,S) / \sum_i 1/\Sigma_i^2(S)$ --

Column 11, line 6, please delete " $\Sigma^1 \Sigma^2_i(S)$ " and insert -- $\sum_i^2(S)$ --

Column 11, line 32, please delete "claim 11, one of" and insert --claim 11, wherein one of--

Column 12, line 16, please delete "according to the" and insert --according to--

Column 12, line 43, please delete "to feed module" and insert --to feed a module--

Column 12, line 51, please delete "relative confidences" and insert --relative confidence--

Signed and Sealed this

Twenty-first Day of April, 2009

JOHN DOLL
*Acting Director of the United States Patent and Trademark Office*